United States Patent
Zhu et al.

(10) Patent No.: US 12,499,550 B2
(45) Date of Patent: Dec. 16, 2025

(54) CHROMINANCE COMPONENT-BASED IMAGE SEGMENTATION METHOD AND SYSTEM, IMAGE SEGMENTATION DEVICE, AND READABLE STORAGE MEDIUM

(71) Applicant: SUZHOU CLEVA PRECISION MACHINERY & TECHNOLOGY CO., LTD., Suzhou (CN)

(72) Inventors: Shaoming Zhu, Suzhou (CN); Xue Ren, Suzhou (CN)

(73) Assignee: Suzhou Cleva Precision Machinery & Technology Co., Ltd.

( * ) Notice: Subject to any disclaimer, the term of this patent is extended or adjusted under 35 U.S.C. 154(b) by 380 days.

(21) Appl. No.: 18/043,428

(22) PCT Filed: Oct. 28, 2020

(86) PCT No.: PCT/CN2020/124354
§ 371 (c)(1),
(2) Date: Feb. 28, 2023

(87) PCT Pub. No.: WO2022/041460
PCT Pub. Date: Mar. 3, 2022

(65) Prior Publication Data
US 2023/0351603 A1    Nov. 2, 2023

(30) Foreign Application Priority Data
Aug. 31, 2020  (CN) .......................... 202010894184.6

(51) Int. Cl.
G06T 7/11    (2017.01)
G06T 7/136    (2017.01)
G06T 7/90    (2017.01)

(52) U.S. Cl.
CPC ................ G06T 7/11 (2017.01); G06T 7/136 (2017.01); G06T 7/90 (2017.01); *G06T 2207/10024* (2013.01)

(58) Field of Classification Search
CPC . G06T 2207/10024; G06T 2207/20161; G06T 7/11; G06T 7/136; G06T 7/90
(Continued)

(56) References Cited

U.S. PATENT DOCUMENTS

| | | |
|---|---|---|
| 10,013,608 B2 | 7/2018 | Sharma et al. |
| 10,043,244 B2 | 8/2018 | Kobayashi |

(Continued)

FOREIGN PATENT DOCUMENTS

| | | |
|---|---|---|
| CN | 101211458 A | 7/2008 |
| CN | 101833749 A | 9/2010 |

(Continued)

OTHER PUBLICATIONS

Xing et al., "Automatic thresholding using a modified valley emphasis" IET Image Processing, vol. 14, Issue3, Feb. 2020 (Year: 2020).*

(Continued)

*Primary Examiner* — Kenny A Cese
(74) *Attorney, Agent, or Firm* — JK Intellectual Property Law, PA

(57) ABSTRACT

The present disclosure relates to an image segmentation method based on a chrominance component. The method includes the following steps: obtaining a chrominance component of an image; generating a chrominance component histogram according to the chrominance component; determining peaks and troughs in the chrominance component histogram according to a preset chrominance interval and preset peak and trough setting conditions; obtaining a segmentation threshold according to the peaks and the troughs;
(Continued)

and segmenting the image into a plurality of regions with different chrominances according to the segmentation threshold. In the present disclosure, the segmentation threshold is obtained according to the peaks and the troughs, the segmentation threshold is dynamically adjusted according to different images, and a fixed segmentation threshold is not used, thereby effectively reducing false segmentation.

9 Claims, 8 Drawing Sheets

(58) Field of Classification Search
USPC .......................................................... 382/164
See application file for complete search history.

(56) References Cited

U.S. PATENT DOCUMENTS

| | | | | |
|---|---|---|---|---|
| 2003/0044061 | A1* | 3/2003 | Prempraneerach | G06V 10/56 382/164 |
| 2005/0141002 | A1 | 6/2005 | Takano et al. | |
| 2014/0177955 | A1* | 6/2014 | Srinivasan | G06V 10/56 382/165 |
| 2014/0313216 | A1* | 10/2014 | Steingrimsson | G06V 30/32 345/589 |
| 2018/0315196 | A1* | 11/2018 | Socek | G06V 10/56 |
| 2021/0136993 | A1 | 5/2021 | Revelli | |

FOREIGN PATENT DOCUMENTS

| | | |
|---|---|---|
| CN | 102800094 A | 11/2012 |
| CN | 103106386 A | 5/2013 |
| CN | 103295013 A | 9/2013 |
| CN | 104021566 A | 9/2014 |
| CN | 105913441 A | 8/2016 |
| CN | 107846583 B | 9/2020 |
| CN | 108734676 B | 12/2020 |
| WO | WO 2020073739 | 4/2020 |

OTHER PUBLICATIONS

International Search Report for Application No. PCT/CN2020/124354, dated May 31, 2021.
International Search Report for Application No. PCT/CN2020/0124360, dated May 31, 2021.
Hussain, et al., "A histogram specification technique for dark image enhancement using a local transformation method", *IPSJ Transactions on Computer Vision and Applications*, 10:3, 2018 https://ipsjcva.springeropen.com/articles/10.1186/s41074-018-0040-0.
US Office Action dated Apr. 28, 2025, for U.S. Appl. No. 18/043,797.

* cited by examiner j = 1
h1i = h2i =28  li = T= 25
h1i < 30, lowValue = 25, highValue = 95 j = 2
h1i = 29  h2i =40  li = 31
h1i < 30, lowValue = li =31, highValue = 95 j= 2
h1i = 41  h2i =82  li = 64
h2i > 75, lowValue = 15, highValue = li = 64 j= 3
h1i = 20  h2i =59  li = 38
h1i < 30, lowValue = li =38, highValue = 95

CHROMINANCE COMPONENT-BASED IMAGE SEGMENTATION METHOD AND SYSTEM, IMAGE SEGMENTATION DEVICE, AND READABLE STORAGE MEDIUM

CROSS-REFERENCE TO RELATED PATENT APPLICATIONS

This application is a national stage of International Application No. PCT/CN2020/124354, filed on Oct. 28, 2020, which claims priority to CN patent application No. 202010894184.6, filed on Aug. 31, 2020. All of the aforementioned applications are hereby incorporated by reference in their entireties.

TECHNICAL FIELD

The present disclosure relates to an image segmentation method and system based on a chrominance component, an image segmentation device, and a readable storage medium, in particular to an image segmentation method and system based on a chrominance component, an image segmentation device, and a readable storage medium that effectively reduce false segmentation.

BACKGROUND

Image segmentation plays an extremely important role in image processing and computer vision, and is also one of classic puzzles in image processing. The image segmentation is an important part of image analysis and computer vision systems, and determines a quality of digital image analysis and a good or bad visual information processing result. Because color images provide richer information than gray images, color image segmentation receives increasing attention. At present, commonly used color digital image segmentation methods include a histogram threshold method, a region-based method, an edge-based method, a feature space clustering method, a neural network method, and the like.

However, direct segmentation based on a lawn color range or a fixed threshold may lead to missing and misjudgment.

SUMMARY

The present disclosure provides an image segmentation method and system based on a chrominance component, an image segmentation device, and a readable storage medium that effectively reduce false segmentation.

The present disclosure provides an image segmentation method based on a chrominance component. The method includes the following steps:
  obtaining a chrominance component of an image;
  generating a chrominance component histogram according to the chrominance component;
  determining peaks and troughs in the chrominance component histogram according to a preset chrominance interval and preset peak and trough setting conditions;
  obtaining a segmentation threshold according to the peaks and the troughs; and
  segmenting the image into a plurality of regions with different chrominances according to the segmentation threshold.

Optionally, the obtaining a chrominance component of an image includes:
  obtaining an HSV image; and
  separating the HSV image to obtain an H channel image and a chrominance component.

Optionally, the obtaining a chrominance component of an image includes:
  obtaining an original image, the original image including a first color space; and
  converting the original image from a first color space to an HSV color space to obtain a chrominance component.

Optionally, the generating a chrominance component histogram according to the chrominance component includes:
  generating a first chrominance component histogram according to the chrominance component; and
  filtering and smoothing the first chrominance component histogram to obtain a second chrominance component histogram.

Optionally, the chrominance component histogram counts frequencies corresponding to different chrominance values, and the preset peak and trough setting conditions include: a peak frequency>k*a trough frequency, the distance between adjacent peaks conforms to a preset distance between peaks, and the peak frequency>a frequency threshold, where k is a constant, including a positive integer, a fraction, a decimal, or the like.

Optionally, the obtaining a segmentation threshold according to the peaks and the troughs includes:
  counting a quantity of the peaks; and
  determining whether the quantity of the peaks is not less than 2; and if the quantity of the peaks is not less than 2, obtaining segmentation threshold through a peak and trough segmentation method; or if the quantity of the peaks is less than 2, obtaining segmentation threshold through an OTSU threshold method.

Optionally, the obtaining a segmentation threshold through a peak-trough segmentation method includes:
  finding a group of peak and trough with a maximum peak-trough ratio from the peaks and the troughs as a target peak and a target trough, and obtaining a position of the trough in the target peak and the target trough as a first position;
  finding, from a left side of the first position, a second position where a maximum peak and a maximum trough on the left side are located, finding, from a right side of the first position, a third position where a maximum peak and a maximum trough on the right side are located, obtaining a chrominance value corresponding to the second position as a second peak chrominance value, and obtaining a chrominance value corresponding to the third position as a third peak chrominance value;
  finding a chrominance value corresponding to a minimum frequency between the second position and the third position as a segmentation chrominance value; and
  obtaining a segmentation threshold corresponding to regions with different chrominances according to the second peak chrominance value, the third peak chrominance value, and the segmentation chrominance value.

The present disclosure further provides an image segmentation system based on a chrominance component. The system includes:
  a chrominance component obtaining module, configured to obtain a chrominance component of an image;
  a statistical module, configured to generate a chrominance component histogram according to the chrominance component;
  a peak and trough identification module, configured to determine peaks and troughs in the chrominance component histogram according to a preset chrominance interval and preset peak and trough setting conditions;

a threshold processing module, configured to obtain a segmentation threshold according to the peaks and the troughs; and an image segmentation module, configured to segment an image into a plurality of regions with different chrominances according to the segmentation threshold.

The present disclosure further provides an image processing device, including a memory and a processor. The memory stores a computer program. When the processor executes the computer program, the steps of the image segmentation method based on a chrominance component are implemented.

The present disclosure further provides a readable storage medium storing a computer program. When the computer program is executed by a processor, the steps of the image segmentation method based on a chrominance component are implemented.

Compared with the prior art, the present disclosure has advantages that a segmentation threshold is obtained according to the peaks and the troughs, a segmentation threshold is dynamically adjusted according to different images, and a fixed segmentation threshold is not used, thereby effectively reducing false segmentation. In the present disclosure, the chrominance component histogram is filtered and smoothed to reduce interference signals in the chrominance component histogram, so as to further reduce false segmentation. The peaks and the troughs in the chrominance component histogram are determined according to the preset chrominance interval and the preset peak and trough setting conditions, thereby improving the speed of identifying the peaks and the troughs.

DETAILED DESCRIPTION

To make a person skilled in the art understand the technical solutions in the present disclosure better, the following clearly and completely describes the technical solutions in the embodiments of the present disclosure with reference to the accompanying drawings in the embodiments of the present disclosure. Apparently, the described embodiments are merely some rather than all of the embodiments of the present disclosure. All other embodiments obtained by a person of ordinary skill in the art based on the embodiments of the present disclosure without creative efforts shall fall within the protection scope of the present disclosure.

Figure 1:
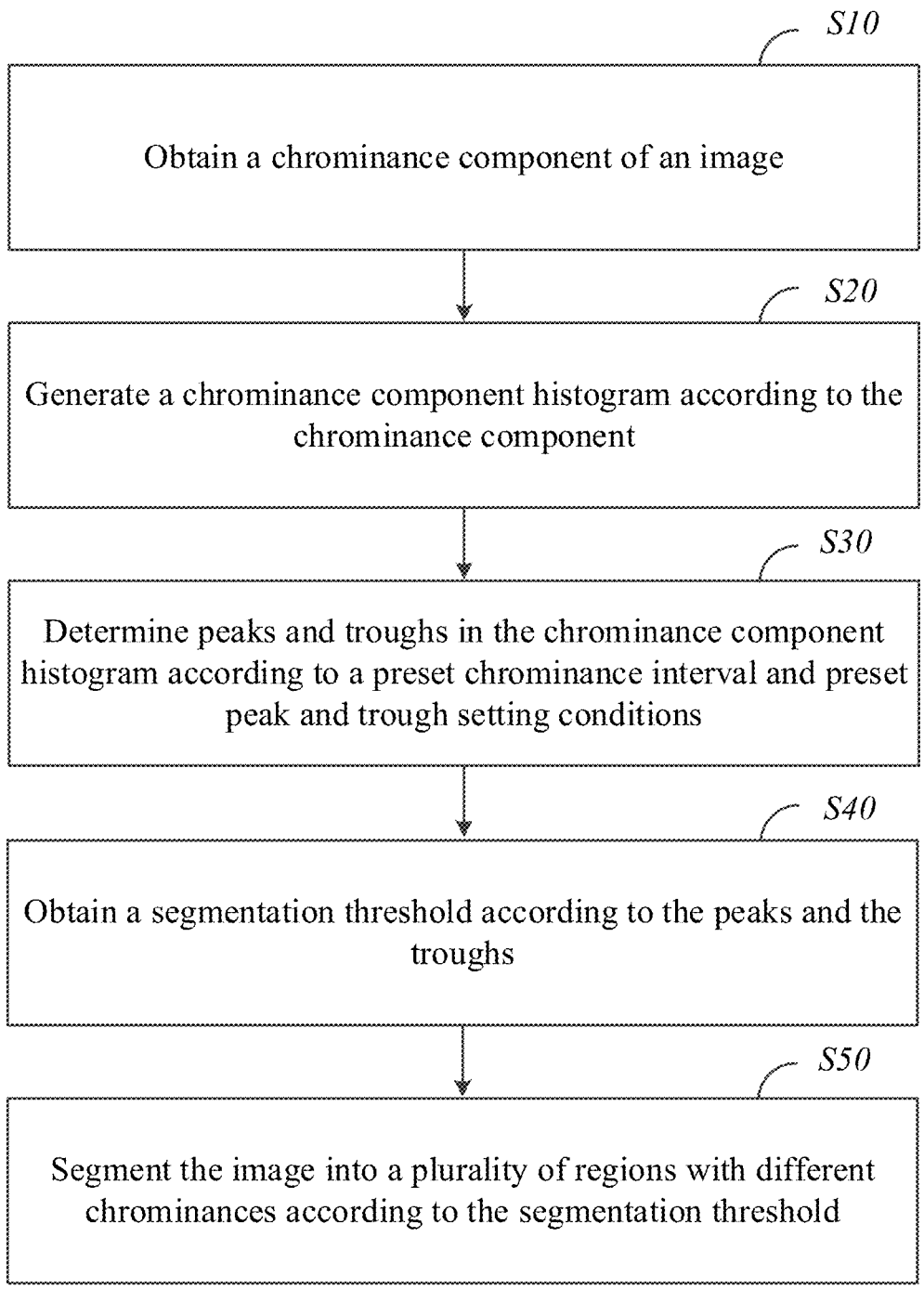
FIG. 1 is a flowchart of a first embodiment of an image segmentation method based on a chrominance component according to the present disclosure.

With reference to FIG. 1, the present disclosure provides an image segmentation method based on a chrominance component. The method includes the following steps:

Step S10: Obtain a chrominance component of an image;

Step S20: Generate a chrominance component histogram according to the chrominance component;

Step S30: Determine peaks and troughs in the chrominance component histogram according to a preset chrominance interval and preset peak and trough setting conditions;

Step S40: Obtain a segmentation threshold according to the peaks and the troughs; and Step S50: Segment the image into a plurality of regions with different chrominances according to the segmentation threshold.

The chrominance component in step S10 may be obtained directly or indirectly. A chrominance component in an HSV image may be obtained directly after separation, and a chrominance component of an RGB image may be obtained after processing such as color space conversion.

Figure 2:
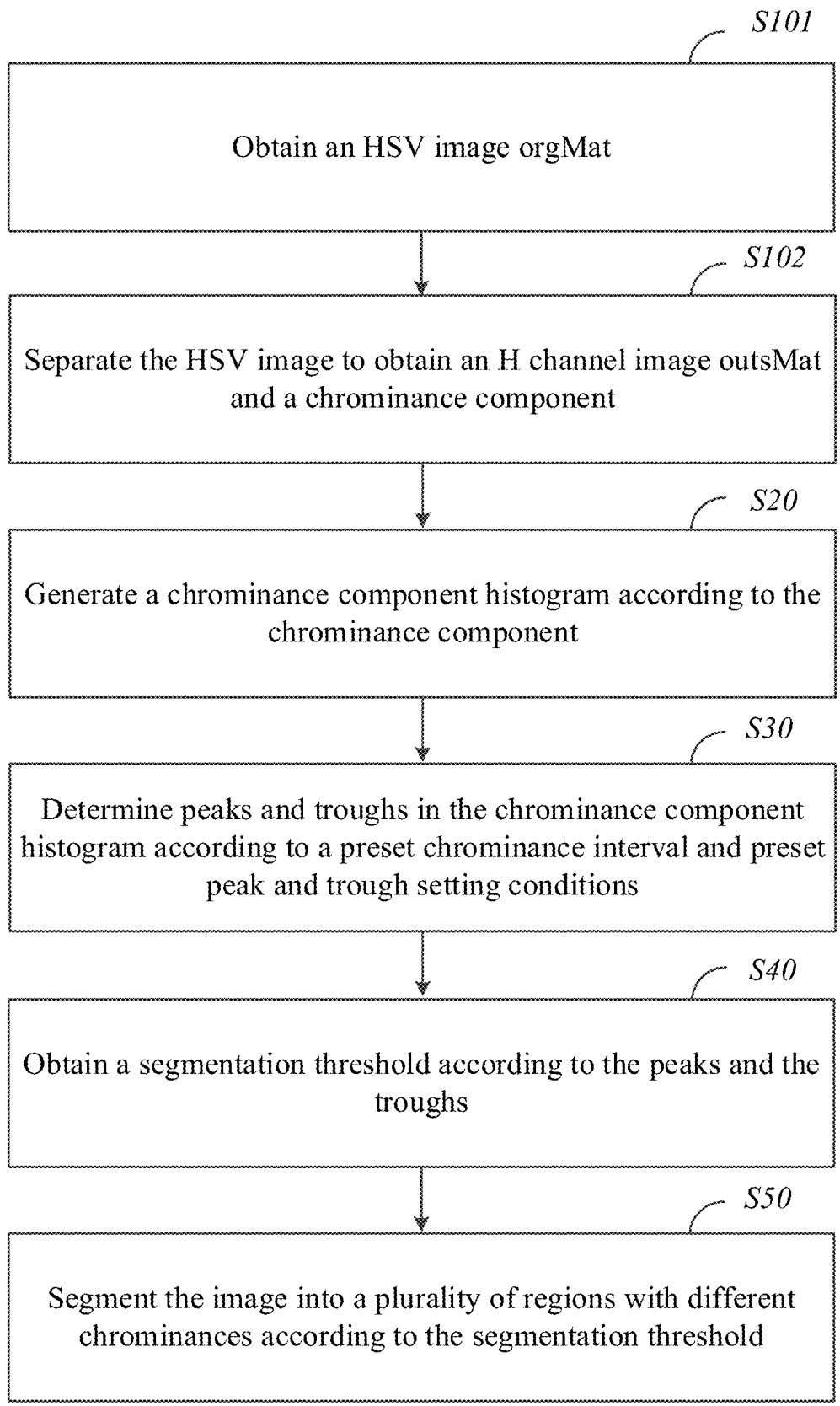
FIG. 2 is a flowchart of a second embodiment of an image segmentation method based on a chrominance component according to the present disclosure.

With reference to FIG. 2, in another embodiment of the present disclosure, step S10 includes:

Step S101: Obtain an HSV image orgMat; and

Step S102: Separate the HSV image to obtain an H channel image outsMat and a chrominance component.

The obtained chrominance component comes from the HSV image, where the HSV image includes a chrominance component, a luminance component, and a saturation component.

Figure 3:
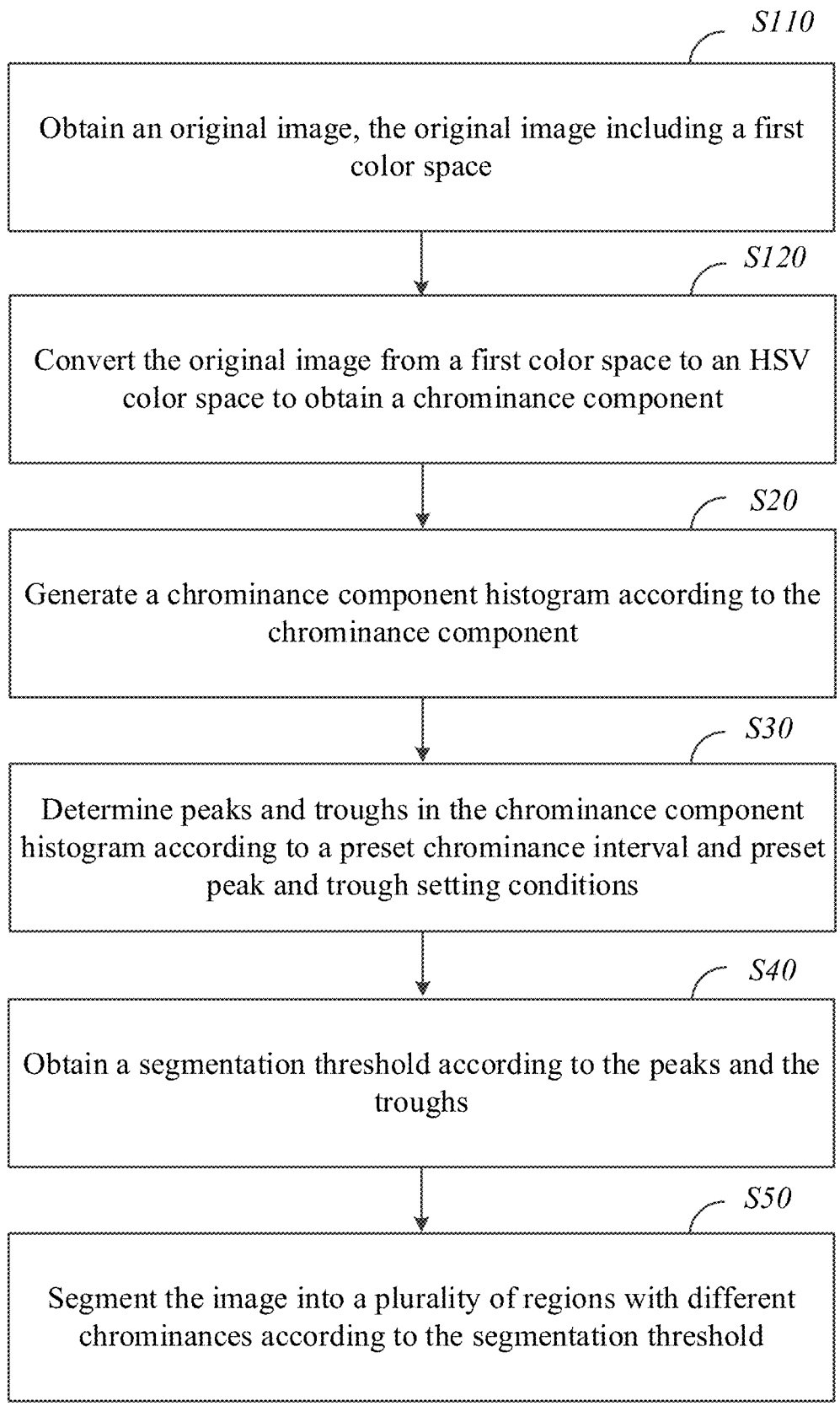
FIG. 3 is a flowchart of a third embodiment of an image segmentation method based on a chrominance component according to the present disclosure.

With reference to FIG. 3, in another embodiment of the present disclosure, step S10 includes:

Step S110: Obtain an original image, the original image including a first color space; and Step S120: Convert the original image from a first color space to an HSV color space to obtain the chrominance component.

The original image comes from a different source and has a different format. The original image is converted according to the format of the original image to obtain the chrominance component. For example, the first color space may be an RGB color space. The original image is then converted from the RGB color space to the HSV color space.

In another embodiment of the present disclosure, step S20 includes:

generate a first chrominance component histogram orgLabelsMat according to the chrominance component; and filter and smooth the first chrominance component histogram orgLabelsMat to obtain a second chrominance component histogram labelsMat.

In another embodiment of the present disclosure, the preset chrominance interval in step S30 may be determined according to needs, and different preset chrominance intervals are set for different use scenarios. For example, the preset chrominance interval may be set to 15-95 for a scenario that an image is segmented by the image segmentation method based on a chrominance component in the present disclosure for lawn recognition.

In another embodiment of the present disclosure, the preset peak and trough setting conditions in step S30 include:

Preset peak and trough setting condition 1: a peak frequency>k*a trough frequency, where k is a constant, including a positive integer, a fraction, a decimal, or the like;

Preset peak and trough setting condition 2: the distance between adjacent peaks conforms to a preset distance between peaks; and Preset peak and trough setting condition 3: the peak frequency>a frequency threshold.

The peaks and the troughs in the chrominance component histogram are determined only when the preset peak and trough setting conditions 1, 2, and 3 are simultaneously satisfied. If the preset peak and trough setting condition 1 and 3 are satisfied, but the preset peak and trough setting condition 2 is not satisfied, peaks with maximum peak frequencies are selected as the peaks in the chrominance component histogram, and the remaining peaks are not regarded as the peaks in the chrominance component histogram.

Figure 4:
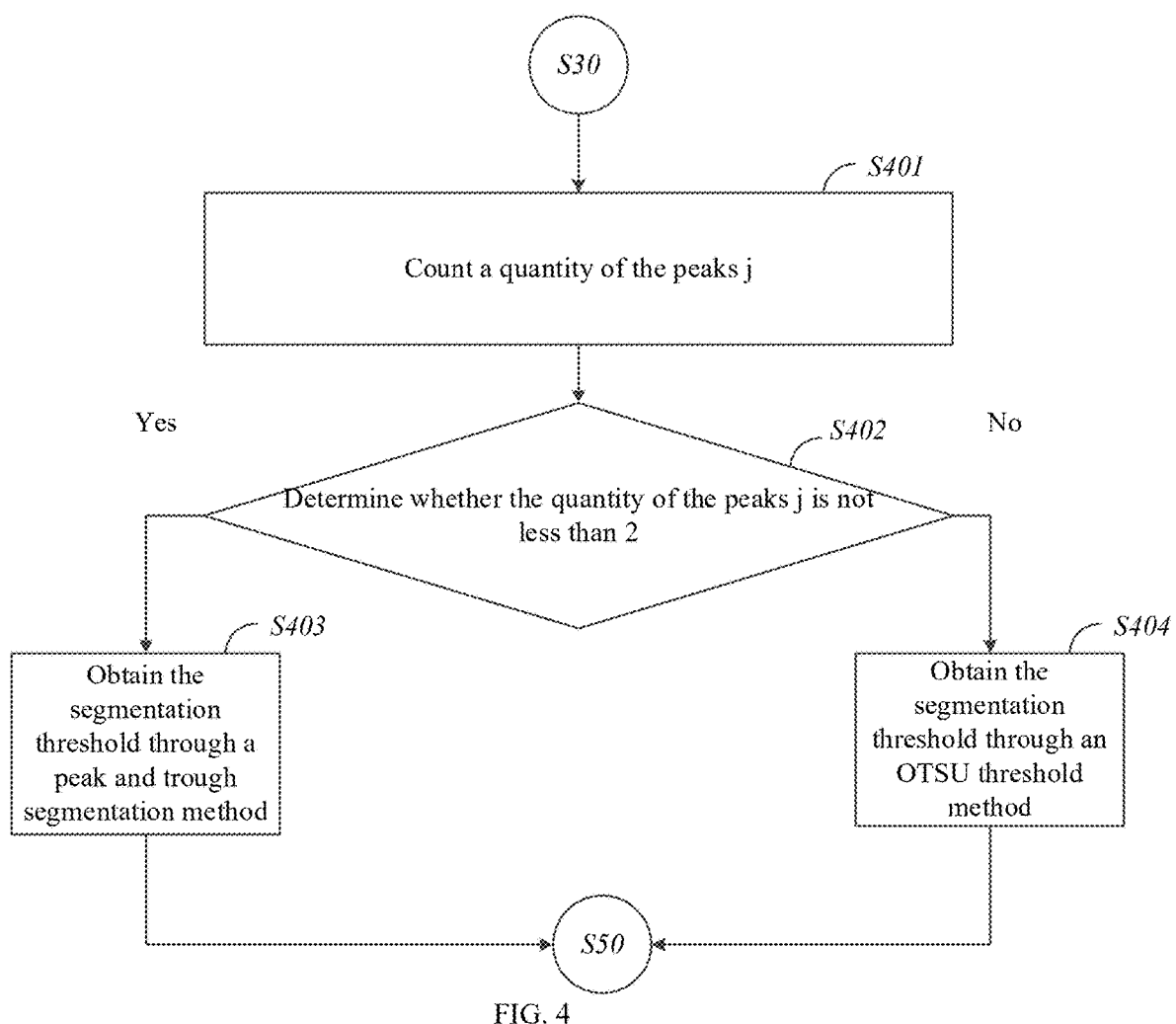
FIG. 4 is a flowchart of step S40 in FIG. 1.

With reference to FIG. 4, in another embodiment of the present disclosure, step S40 includes:

Step S401: Count a quantity of the peaks j;

Step S402: Determine whether the quantity of the peaks j is not less than 2; and if the quantity of the peaks j is not less than 2, perform step S403; or if the quantity of the peaks j is less than 2, perform step S404; and Step S403: Obtain a segmentation threshold through a peak and trough segmentation method; or Step S404: Obtain a segmentation threshold through an OTSU threshold method.

Figure 5:
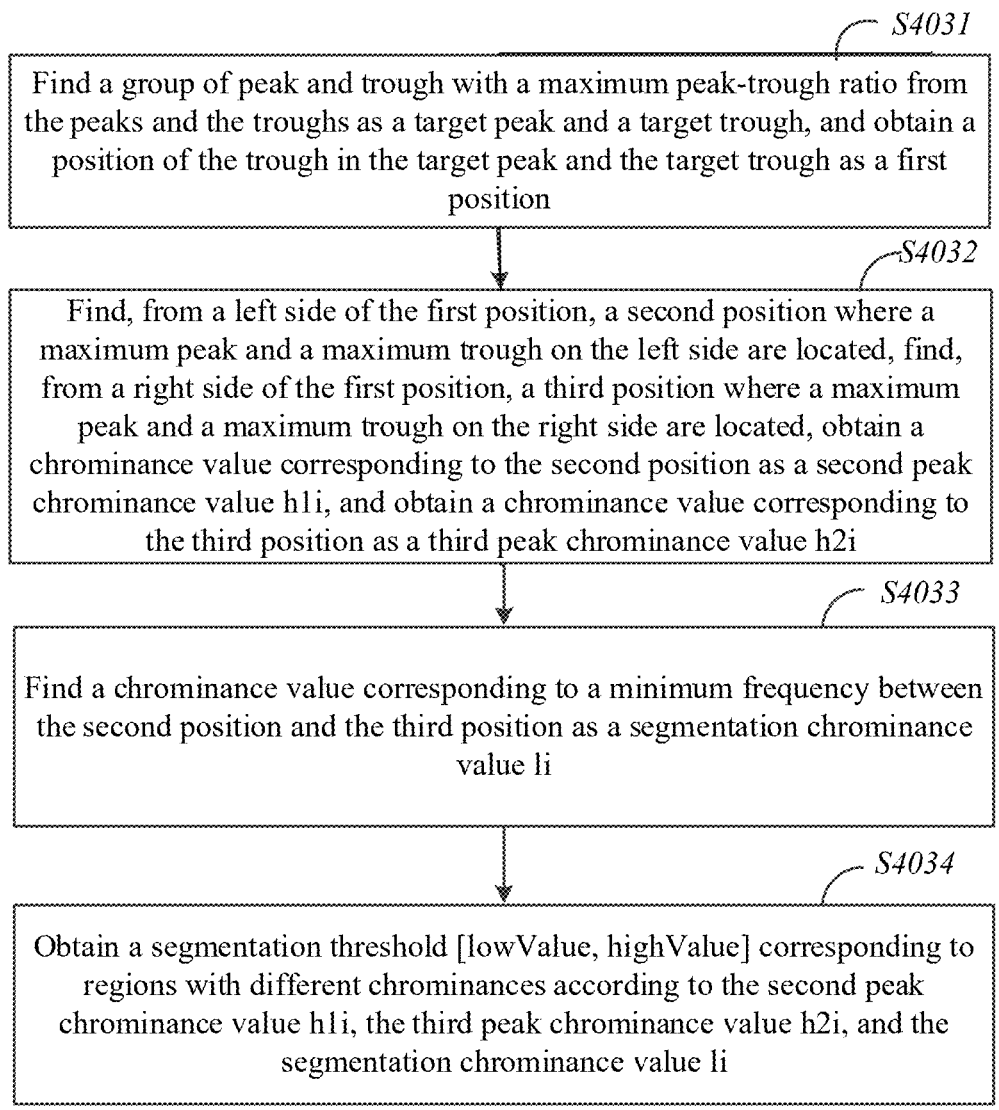
FIG. 5 is a flowchart of step S403 in FIG. 4.
Figure 6:
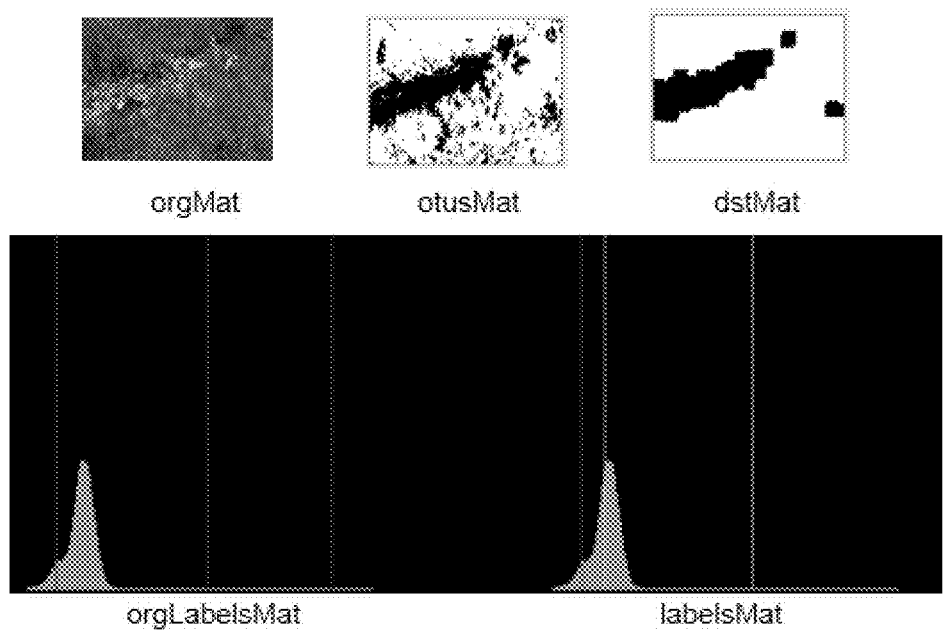
FIG. 6 is a result of processing a first image by the image segmentation method based on a chrominance component according to the present disclosure.
Figure 7:
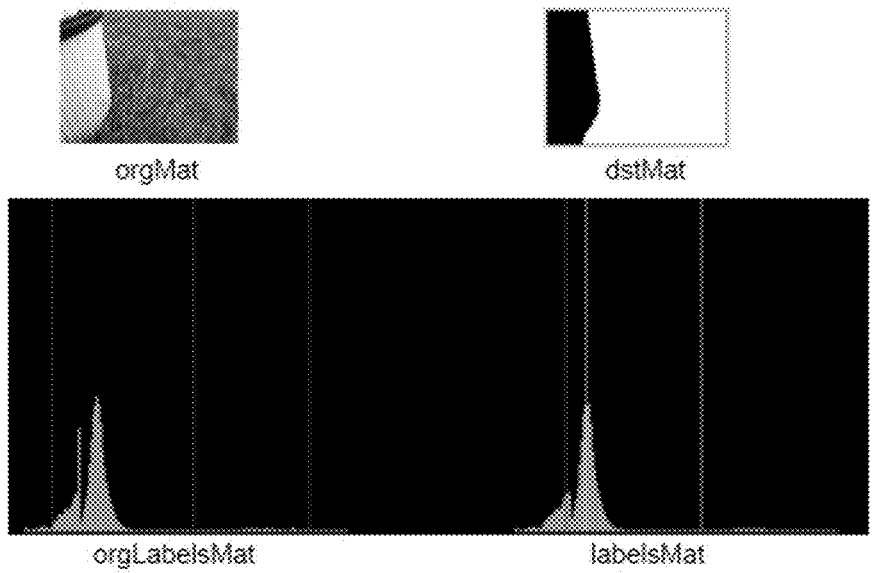
FIG. 7 is a result of processing a second image by the image segmentation method based on a chrominance component according to the present disclosure.
Figure 8:
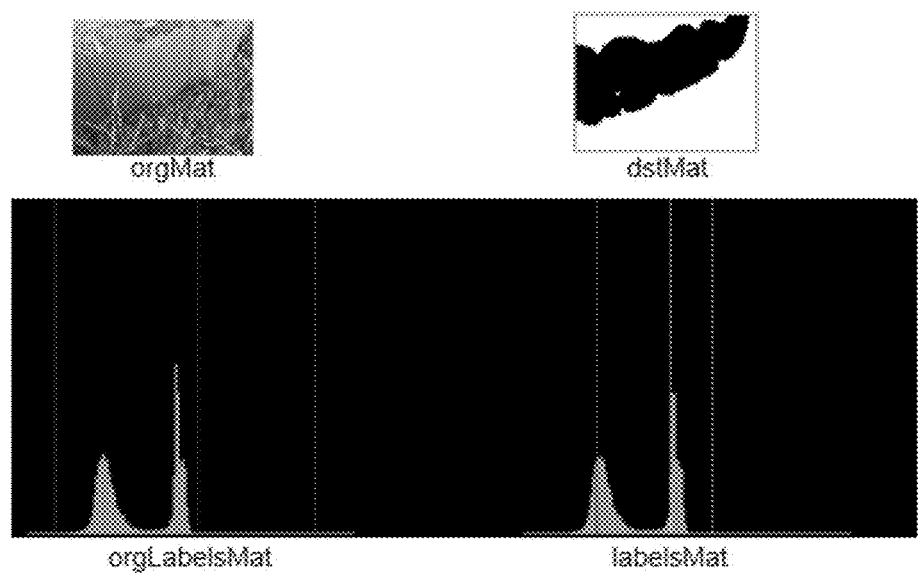
FIG. 8 is a result of processing a third image by the image segmentation method based on a chrominance component according to the present disclosure.
Figure 9:
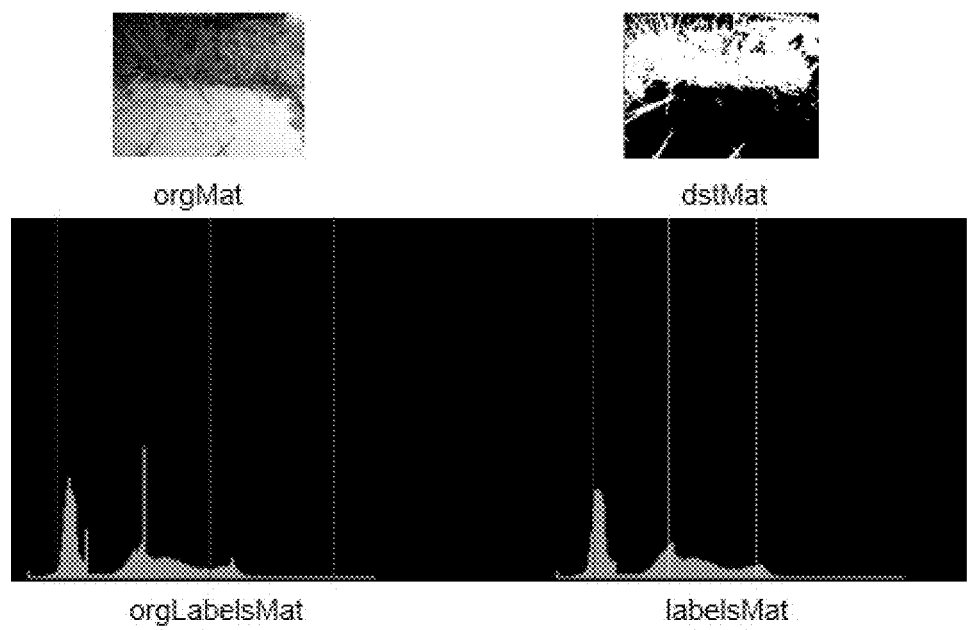
FIG. 9 is a result of processing a fourth image by the image segmentation method based on a chrominance component according to the present disclosure.

With reference to FIG. 5, in another embodiment of the present disclosure, step S403 includes:

Step S4031: Find a group of peak and trough with a maximum peak-trough ratio from the peaks and the troughs as a target peak and a target trough, and obtain a position of the trough in the target peak and the target trough as a first position;

Step S4032: Find, from a left side of the first position, a second position where a maximum peak and a maximum trough on the left side are located, find, from a right side of the first position, a third position where a maximum peak and a maximum trough on the right side are located, obtain a chrominance value corresponding to the second position as a second peak chrominance value $h1i$, and obtain a chrominance value corresponding to the third position as a third peak chrominance value $h2i$;

Step S4033: Find a chrominance value corresponding to a minimum frequency between the second position and the third position as a segmentation chrominance value $li$; and Step S4034: Obtain a segmentation threshold [lowValue, highValue] corresponding to regions with different chrominances according to the second peak chrominance value $h1i$, the third peak chrominance value $h2i$, and the segmentation chrominance value $li$. The second peak chrominance value $h1i$ is compared with a preset second peak threshold and the third peak chrominance value $h2i$ is compared with a preset third peak threshold to obtain peak chrominance value comparison results, and the segmentation threshold corresponding to regions with different chrominances is obtained according to the peak chrominance value comparison results.

When the peak chrominance value comparison results satisfy "the second peak chrominance value $h1i$>the preset second peak threshold, and the third peak chrominance value $h2i$>the preset third peak threshold", a minimum value of the preset chrominance interval (or another value of the preset chrominance interval) is set as a minimum value lowValue of the segmentation threshold, and the segmentation chrominance value $li$ is set as a maximum value highValue of the segmentation threshold.

When the peak chrominance value comparison results do not satisfy "the second peak chrominance value $h1i$>the preset second peak threshold, and the third peak chrominance value $h2i$>the preset third peak threshold", the segmentation chrominance value $li$ is set as a minimum value lowValue of the segmentation threshold, and a maximum value of the preset chrominance interval (or another value of the preset chrominance interval) is set as a maximum value highValue of the segmentation threshold.

For example, the preset chrominance interval [15, 95], the preset second peak threshold=30, and the preset third peak threshold=75. If $h1i$>30 and $h2i$>75 (a large peak is bluish), lowValue=15 and highValue=$li$; otherwise, lowValue=$li$ and highValue=95.

In another embodiment of the present disclosure, if the quantity of the peaks j is less than 2, the segmentation chrominance value $li$ is obtained by an OTSU threshold method, and the segmentation threshold [lowValue, highValue] corresponding to regions with different chrominances is obtained according to the quantity of the peaks.

In order to accurately segment a region with a specific chrominance in the preset chrominance interval in the image, a lowest demarcation point is searched from the minimum value of the preset chrominance interval, and if the lowest demarcation point exists, the second peak chrominance value and the third peak chrominance value are preset according to a first preset rule; or if there is no lowest demarcation point, the second peak chrominance value and the third peak chrominance value are preset according to a second preset rule. A chrominance value of the lowest demarcation point is $mi$, and a frequency corresponding to $mi$ is greater than frequencies corresponding to $mi+1$ and $mi+2$. Segmentation of a lawn image is used as an example, where chrominance values of some grasses in the lawn are located in a yellow-red chrominance range (specific chrominance). By searching for a lowest demarcation point, yellow-red degree grasses can be prevented from being segmented into a non-grass region.

If the lowest demarcation point exists, the second peak chrominance value and the third peak chrominance value are preset according to the quantity of the peaks and the first preset rule. When the quantity of the peaks is 0, the second peak chrominance value $h1i$ is set as the chrominance value $mi$ of the lowest demarcation point, and the third peak chrominance value $h2i$ is set as the maximum value of the preset chrominance interval (or another value of the preset chrominance interval). When the quantity of the peaks is 1, the chrominance value of the peak is $h1$, the second peak chrominance value $h1i$ is set as the chrominance value of the lowest demarcation point, and the third peak chrominance value is set as the $h1$.

If the lowest demarcation point does not exist, the second peak chrominance value $h1i$ and the third peak chrominance value $h2i$ are preset according to the quantity of the peaks and the second preset rule. When the quantity of the peaks is 0, the second peak chrominance value $h1i$ is set as the minimum value of the preset chrominance interval (or another value of the preset chrominance interval), and the third peak chrominance value h2i is set as the maximum value of the preset chrominance interval (or another value of the preset chrominance interval). When the quantity of the peaks is 1, the chrominance value of the peaks is h1, the second peak chrominance value h1i is set as the h1, and the third peak chrominance value is set as the h1.

When the quantity of the peaks is 0, the segmentation chrominance value li, the second peak chrominance value h1i, and the third peak chrominance value h2i are compared to obtain a peak chrominance value comparison result, and the segmentation threshold corresponding to regions with different chrominances is obtained according to the peak chrominance value comparison result.

When the quantity of the peaks is 0, the comparison result includes:

1-1 When the peak chrominance value comparison result satisfies "the segmentation chrominance value li>the third peak chrominance value h2i", the segmentation chrominance value li is set as the minimum value lowValue of the segmentation threshold, and the maximum value of the preset chrominance interval (or another value of the preset chrominance interval) is set as the maximum value highValue of the segmentation threshold.

1-2 When the peak chrominance value comparison result satisfies "the segmentation chrominance value li<the second peak chrominance value h1i", the minimum value of the preset chrominance interval (or another value of the preset chrominance interval) is set as the minimum value lowValue of the segmentation threshold, and the segmentation chrominance value li is set as the maximum value highValue of the segmentation threshold.

1-3 When the peak chrominance value comparison result satisfies "the second peak chrominance value h1i≤the segmentation chrominance value li≤the third peak chrominance value h2i", the second peak chrominance value h1i is set as the minimum value lowValue of the segmentation threshold, and the third peak chrominance value h2i is set as the maximum value highValue of the segmentation threshold.

When the quantity of the peaks is 1, the second peak chrominance value h1i is compared with the preset second peak threshold and the third peak chrominance value h2i is compared with the preset third peak threshold to obtain peak chrominance value comparison results, and the segmentation threshold corresponding to regions with different chrominances is obtained according to the peak chrominance value comparison results. The comparison process in which the quantity of the peaks is 1 is the same as the comparison process in which the quantity of the peaks j is not less than 2. Refer to the specific process of step S4034.

With reference to FIG. 6 to FIG. 9, after the image orgMat in step S10 is separated to obtain the H channel image outsMat, the first chrominance component histogram orgLabelsMat and the second chrominance component histogram labelsMat are generated in step S20; and peaks and troughs are identified in step S30, and then a segmentation result dstMat is obtained after steps S40 and S50, where the dstMat shows that the image is segmented into two regions.

Figure 10:
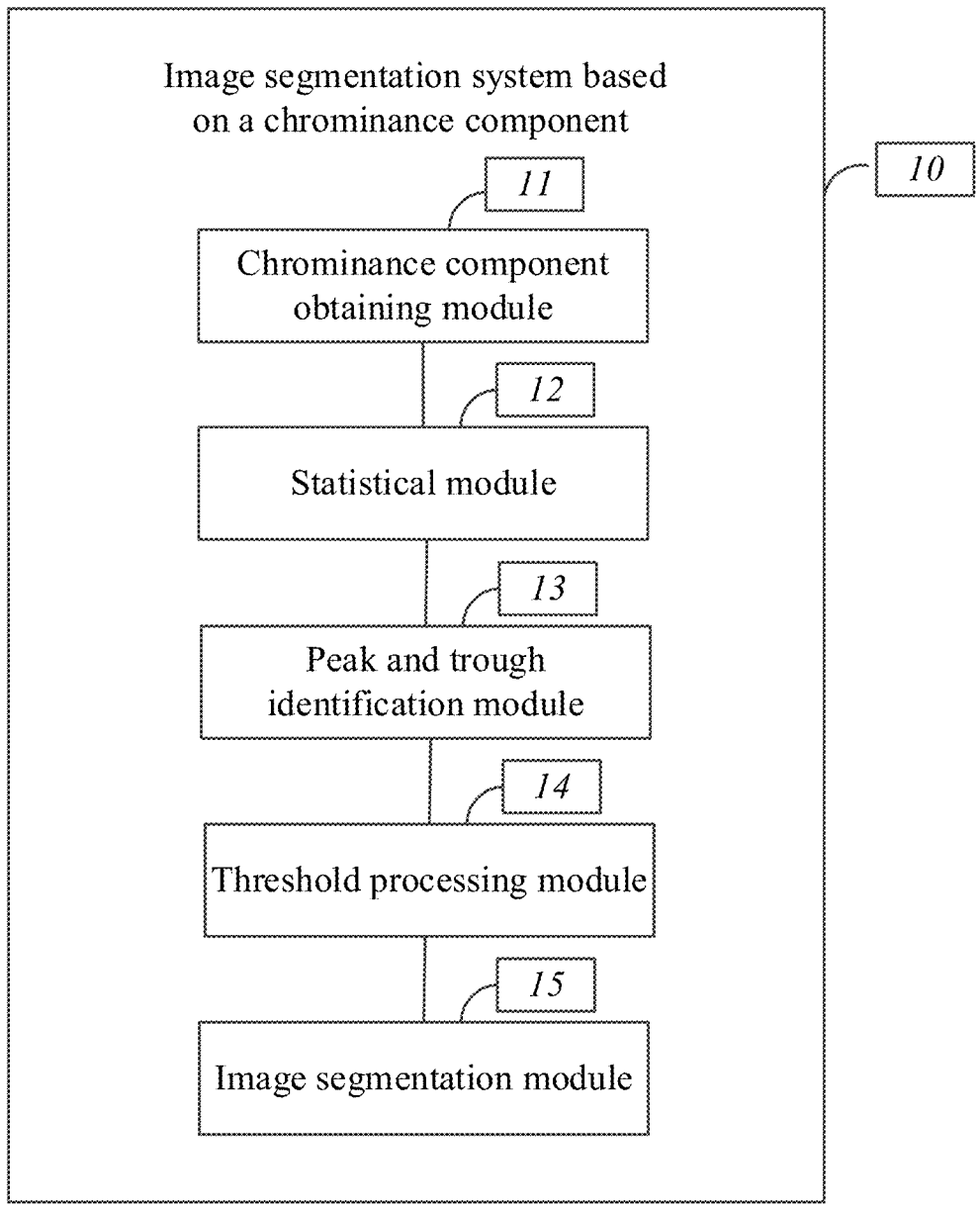
FIG. 10 is a principal block diagram of an image segmentation system based on a chrominance component according to the present disclosure.

With reference to FIG. 10, the present disclosure further provides an image segmentation system 10 based on a chrominance component. The system includes:

a chrominance component obtaining module 11, configured to obtain a chrominance component of an image;

a statistical module 12, configured to generate a chrominance component histogram according to the chrominance component;

a peak and trough identification module 13, configured to determine peaks and troughs in the chrominance component histogram according to a preset chrominance interval and preset peak and trough setting conditions;

a threshold processing module 14, configured to obtain a segmentation threshold according to the peaks and the troughs; and an image segmentation module 15, configured to segment the image into a plurality of regions with different chrominances according to the segmentation threshold.

The present disclosure further provides an image processing device, including a memory and a processor. The memory stores a computer program. When the processor executes the computer program, the steps of the image segmentation method based on a chrominance component are implemented.

The present disclosure further provides a readable storage medium storing a computer program. When the computer program is executed by a processor, the steps of the image segmentation method based on a chrominance component are implemented.

To sum up, a segmentation threshold is obtained according to the peaks and the troughs, a segmentation threshold is dynamically adjusted according to different images, and a fixed segmentation threshold is not used, thereby effectively reducing false segmentation. In the present disclosure, the chrominance component histogram is filtered and smoothed to reduce interference signals in the chrominance component histogram, so as to further reduce false segmentation. The peaks and the troughs in the chrominance component histogram are determined according to the preset chrominance interval and the preset peak and trough setting conditions, thereby improving the speed of identifying the peaks and the troughs.

In addition, it should be understood that, although this specification is described according to the embodiments, but not every embodiment includes only one independent technical solution. The description of the specification is only for the sake of clarity, and a person skilled in the art should regard the specification as a whole. The technical solutions in the embodiments can be properly combined to form other embodiments that can be understood by the person skilled in the art.

A series of detailed descriptions set forth above are merely specific descriptions directed to the feasible embodiments of the present disclosure, and are not intended to limit the protection scope of the present disclosure. Any equivalent embodiment or alteration made without departing from the spirit of the present disclosure shall fall within the protection scope of the present disclosure.

The invention claimed is:

1. A method of image segmentation of an area including a lawn based on a chrominance component, wherein the method comprises the following steps:

obtaining a chrominance component of an image of at least a portion of the area;

generating a chrominance component histogram according to the chrominance component;

determining peaks and troughs in the chrominance component histogram according to a preset chrominance interval and preset peak and trough setting conditions;

obtaining a segmentation threshold according to the peaks and the troughs as follows:

a. counting a quantity of the peaks; and b. determining whether the quantity of the peaks is not less than 2; and
  i. if the quantity of the peaks is not less than 2, obtaining the segmentation threshold through a peak and trough segmentation method; or
  ii. if the quantity of the peaks is less than 2, obtaining the segmentation threshold through an OTSU threshold method; and
segmenting the image into a plurality of regions with different chrominances according to the segmentation threshold, a first of the regions being a grass area comprising part of the lawn, and a second of the regions being a non-grass area not comprising part of the lawn.

2. The method according to claim 1, wherein the obtaining a chrominance component of an image step comprises:
obtaining an HSV image; and
separating the HSV image to obtain an H channel image and the chrominance component.

3. The method according to claim 1, wherein the obtaining a chrominance component of an image step comprises:
obtaining an original image, the original image comprising a first color space; and
converting the original image from the first color space to an HSV color space to obtain the chrominance component.

4. The method according to claim 1, wherein the generating a chrominance component histogram according to the chrominance component step comprises:
generating a first chrominance component histogram according to the chrominance component; and
filtering and smoothing the first chrominance component histogram to obtain a second chrominance component histogram.

5. The method according to claim 1, wherein the chrominance component histogram counts frequencies corresponding to different chrominance values, and the preset peak and trough setting conditions comprise: a peak frequency >k*a trough frequency, and a distance between adjacent peaks conforms to a preset distance between peaks, wherein k is a constant.

6. The method according to claim 1, wherein the obtaining a segmentation threshold through a peak and trough step comprises:
finding a group of peaks and troughs with a maximum peak-trough ratio from the peaks and the troughs as a target peak and a target trough, and obtaining a position of the trough in the target peak and the target trough as a first position;
finding, from a left side of the first position, a second position where a maximum peak and a maximum trough on the left side are located, finding, from a right side of the first position, a third position where a maximum peak and a maximum trough on the right side are located, obtaining a chrominance value corresponding to the second position as a second peak chrominance value, and obtaining a chrominance value corresponding to the third position as a third peak chrominance value;
finding a chrominance value corresponding to a minimum frequency between the second position and the third position as a segmentation chrominance value; and
obtaining a segmentation threshold corresponding to regions with different chrominances according to the second peak chrominance value, the third peak chrominance value, and the segmentation chrominance value.

7. An image segmentation system based on a chrominance component, wherein the system comprises:
a chrominance component obtaining module, configured to obtain a chrominance component of an image;
a statistical module, configured to generate a chrominance component histogram according to the chrominance component;
a peak and trough identification module, configured to determine peaks and troughs in the chrominance component histogram according to a preset chrominance interval and preset peak and trough setting conditions;
a threshold processing module, configured to obtain a segmentation threshold according to the peaks and the troughs; and
an image segmentation module, configured to segment the image into a plurality of regions with different chrominances according to the segmentation threshold, wherein operation of the system causes the steps of the image segmentation method according to claim 1 to be implemented.

8. An image processing device, comprising a memory and a processor, the memory storing a computer program, wherein when the processor executes the computer program, the steps of the image segmentation method based on a chrominance component according to claim 1 are implemented.

9. A non-transitory computer readable storage medium, storing a computer program, wherein when the computer program is executed by a processor, the steps of the image segmentation method based on a chrominance component according to claim 1 are implemented.

\* \* \* \* \*